US006659548B2

(12) United States Patent  
Becker et al.

(10) Patent No.: US 6,659,548 B2
(45) Date of Patent: Dec. 9, 2003

(54) VEHICLE SEAT WITH A SEAT CARRIER AND WITH A BUCKLE OF A SAFETY BELT POSITIONED AT SAID SEAT CARRIER

(75) Inventors: Burckhard Becker, Solingen (DE); Michael Hennicke, Solingen (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 130 days.

(21) Appl. No.: 09/924,933

(22) Filed: Aug. 8, 2001

(65) Prior Publication Data

US 2002/0024242 A1 Feb. 28, 2002

(30) Foreign Application Priority Data

Aug. 25, 2000 (DE) .......................................... 100 41 827

(51) Int. Cl.[7] ................................................ B60N 2/42
(52) U.S. Cl. ..................... 297/216.1; 297/470; 297/479
(58) Field of Search ........................ 297/216.1, 216.19, 297/216.2, 216.17, 216.16, 480, 469, 470, 479, 344.15, 325, 330, 344.17; 280/804, 806

(56) References Cited

U.S. PATENT DOCUMENTS

| | | | | |
|---|---|---|---|---|
| 5,152,552 A | * | 10/1992 | Ikegaya | |
| 5,188,425 A | * | 2/1993 | Foster et al. | |
| 5,782,492 A | * | 7/1998 | Ojima et al. | |
| 5,971,488 A | * | 10/1999 | Pedronno et al. | |
| 6,050,635 A | * | 4/2000 | Pajon et al. | |
| 6,109,691 A | * | 8/2000 | Gray et al. | |
| 6,116,689 A | | 9/2000 | Bauer et al. | |
| 6,382,718 B1 | * | 5/2002 | Janke et al. | |
| 6,502,798 B1 | * | 1/2003 | Frohnhaus et al. | |

FOREIGN PATENT DOCUMENTS

DE 3237167 * 4/1984

* cited by examiner

*Primary Examiner*—Milton Nelson, Jr.
(74) *Attorney, Agent, or Firm*—Akerman Senterfitt

(57) ABSTRACT

The vehicle seat of a vehicle has a seat carrier with a side part, a buckle of a safety belt positioned thereon and a vertically adjustable underframe. The underframe is provided with a sector gear. An engaging element is arranged on the seat carrier and is designed to cooperate with the sector gear. During normal, non-accidental circumstances, the sector gear is in a rest position in which the engaging element is free from the sector gear. The buckle is connected to an upper end of a rope that cooperates with the engaging element. In an accident situation the engaging element engages the sector gear. A tightening unit for the belt has a driving cylinder. The rope is deflected in its direction at a point of deflection. A lower portion of the rope runs substantially in longitudinal direction of the side part. The other end of the rope is arranged on the driving cylinder. A holder for the tightening unit is provided on the side part.

17 Claims, 6 Drawing Sheets

Figure 1:
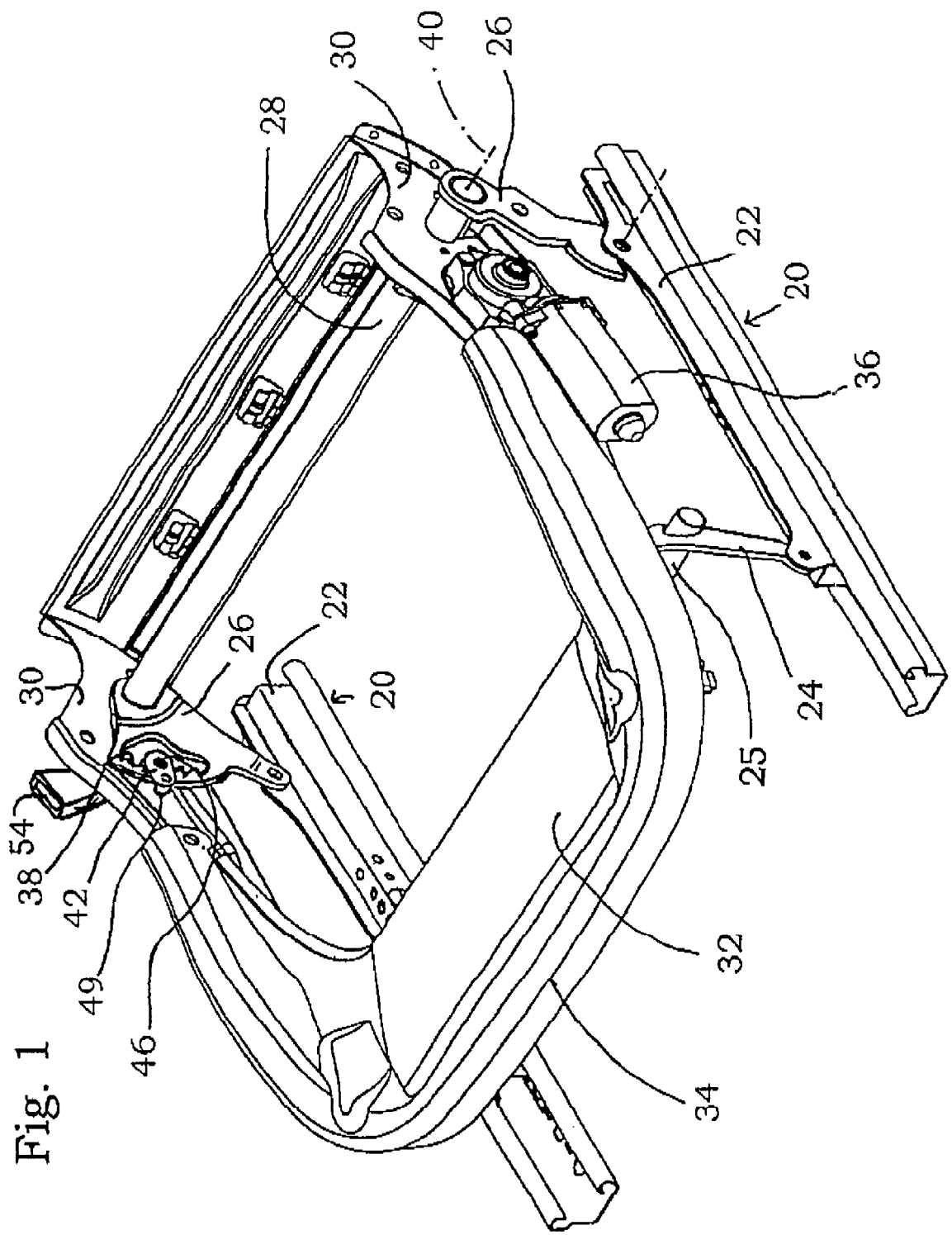

VEHICLE SEAT WITH A SEAT CARRIER AND WITH A BUCKLE OF A SAFETY BELT POSITIONED AT SAID SEAT CARRIER

The invention relates to a vehicle seat with a seat carrier, with a buckle of a safety belt positioned thereon and with a vertically adjustable underframe, said underframe being provided with a sector gear and said seat carrier having an engaging element arranged thereon which is designed to cooperate with the sector gear and which under normal circumstances is in a position of rest in which it is spaced from the sector gear and the buckle being connected to an upper end of a means with tensile strength that is connected to cooperate with the engaging element so that, in an accident situation, the engaging element engages the sector gear.

This type of a vehicle seat forms the subject of DE 197 40 043 A.

The advantage of this kind of a vehicle seat lies in the fact that the buckle is positioned directly on the seat carrier. When the vehicle seat is adjusted in height, it maintains its position for a user. Accordingly, the user can find the buckle at always the same position, irrespective of the adjustment.

The problem with a buckle positioned on the seat carrier of a vertically adjustable vehicle seat is that, when the vehicle in which the vehicle seat is installed is involved in an accident, very high tensile loads must be transmitted from the buckle to an underframe of the vehicle. According to the prior art, sector gear and engaging element mesh, said mesh only taking place in an accident situation. Once engagement is accomplished, the buckle is connected to the underframe in such a manner that it resists tension, the connection passing through the means with tensile strength, the sector gear and the engaging element as well as a couple of rails of the longitudinal adjusting device into the underframe of the vehicle. Under normal driving circumstances, no engagement occurs so that the vertical adjustment can be actuated without collision or any other impairment, diverting the forces in the manner described.

An accident situation of a vehicle in which the vehicle seat is installed in this context means a situation in which acceleration is so high that a control switch of an air bag becomes responsive.

With the previously known vehicle seat, a sufficiently strong tensile load, as it just only occurs in accident situations, must actively act on the buckle to bring about the engagement described. The means with tensile strength needs to move a short distance to engage. This distance of movement is lost for decelerating and restraining an occupant. Additionally, under normal circumstances, the safety belt is not placed as tightly on the user as it would be desirable for his restraint and deceleration in the event of an accident.

It has become known to utilize what are termed belt tighteners with a driving cylinder that are triggered by the control switch in the event of an accident and already respond before the user, on account of his inertia, actually loads the safety belt. However, this previously known solution has the disadvantage that the position of the buckle is not related to the seat carrier, but to the underframe. The position of the buckle changes with vertical adjustment.

This is were the invention is setting in. It is its object to improve the vehicle seat of the type mentioned herein above in such a manner that, in the event of an accident, engagement is already actuated when the user has not yet moved with respect to the vehicle seat, the positioning of the buckle relative to the seat carrier being maintained, and that the safety belt can additionally be tightened in order to reduce the play in the safety belt.

In view of the vehicle seat of the type mentioned herein above, the solution to this object is to provide the belt with a tightening unit that has a driving cylinder, to deflect the means with tensile strength in its direction at a point of deflection in such a manner that a lower portion of the means with tensile strength runs substantially in longitudinal direction of the side part, to have the other end of the means with tensile strength arranged on the driving cylinder and to provide a holding means for the tightening unit on the side part.

So, according to the invention, a tightening unit with a driving cylinder is used, which may also be described as a buckle tightener or a belt buckle tightener. As it has been known in principle from other previous publications, it is utilized to rapidly pull the buckle downward in the initial stage of an accident situation, so that the safety belt is caused to tighten and is better capable of absorbing the later occurring relative motion of a user relative to the vehicle seat.

According to the invention, the tensile strength of the driving cylinder is now used to force the sector gear and the engaging element into mesh.

Accordingly, the particular advantage of the invention is that triggering the buckle tightener not only causes the belt to tighten but also brings about the positive engagement between sector gear and engaging element. If any, this engagement requires only a short portion of the range of movement of the belt buckle or a small pivoting movement of the belt buckle tightener, the belt has still enough distance to move for tightening, or the buckle tightener is designed with an accordingly longer distance of movement, respectively.

On account of the deflection, the means with tensile strength, which is more specifically designed as a steel cable, has an upper portion running between buckle and point of deflection and a lower portion running between point of deflection and driving cylinder. The two portions are relatively angled, they are typically arrayed in the shape of a V. On triggering the driving cylinder, the means with tensile strength moves relative to the point of deflection. The buckle is drawn downward. These movements or the forces or reaction forces generating these movements are now utilized to bring about the engagement between the engaging element and the sector gear. Several possibilities lie within the scope of the invention, some of which are explained herein after without any claim for exhaustiveness.

First, the buckle tightener can be fixed together with its driving cylinder in a swivel joint on the side piece in such a manner that a certain tilting motion about the swivel joint is possible. It is fastened by a bolt. The deflection of the means with tensile strength occurs at this bolt. The fixation is executed in such a way that, at normal operation, the buckle tightener cannot pivot about the bolt. On triggering the driving cylinder, the forces produced are so high that the buckle tightener pivots about the bolt. This pivoting movement is utilized to cause the engaging element and the sector gear to move into mesh. For this purpose, the engaging element for example is attached to the buckle tightener itself so that it pivots together with the latter. This pivoting movement is utilized for engagement.

Second, the driving cylinder can be connected to the remaining portions of the buckle tightener, more specifically to a deflection housing, by way of a deformable holding device. Prior to its actuation, the driving cylinder is at first spaced from a deflection housing by a greater distance and is supported by said housing by way of a holding device. The holding device transmits the reaction force. On triggering the driving cylinder and only in the event a resistance is opposed to the tensile strength in the means with tensile strength and thereby in the belt that is sufficient and is only experienced when the belt is tightened against a passenger, the holding device is deformed in such a manner that the driving cylinder comes nearer to the housing of the buckle tightener. This movement is utilized to cause the engaging element and the sector gear to move into mesh.

Third, it is possible to allow deflection to take place on the engaging element itself. When the driving cylinder is fired, the then effected traction in the means with tensile strength produces a high force at the point of deflection which is now realized by the engaging element. The engaging element is thus moved, e.g. pivoted, the sector gear is engaged.

Fourth, it is possible to provide for the engaging element in proximity to the deflection point at a place at which it at least slightly deflects the lower portion or the upper portion. When a tensile force occurs in the means with tensile strength on account of an actuation of the driving cylinder, a force is exerted onto the engaging element.

Fifth, it is possible to utilize a rotation occasioned by the actuation of the driving cylinder at the point of deflection to move an engaging element into mesh with the sector gear. The means with tensile strength encompasses a rotatable bolt at the point of deflection for example. The rotatable bolt is rotatably connected to the engaging element. In another design, the rotatable bolt has a projection that abuts a stop of the engaging element. As soon as the rotatable bolt is rotated, the engaging element pivots into the position of engagement.

All the alternatives that have been discussed may also be realized in mechanical reversal by moving the sector gear against a more or less stationary engaging element.

In a preferred development, the sector gear is executed on a curved sword that is hinged to a seat rail of the underframe. On account of the hinge, it may adopt such a position when the seat carrier is adjusted in height that under normal circumstances it does not move into mesh with the engaging element.

In another, preferred embodiment, the underframe has a rear swivelling prop to which the seat carrier is hinged in such a manner that it is pivotal about an axis. The sector gear exhibits a course that is concentric about the axis and is non-rotatably connected to the swivelling prop. The advantage of this embodiment is that the sector gear always keeps the same spacing from the engaging element that is arranged on the seat carrier. As a result thereof, it must not try to find and adopt somehow the right position.

In a preferred embodiment, the engaging element is additionally connected to the seat carrier by way of a positioning means that is for example designed as an elastic means or as a destructible means. This positioning means is overcome in the event of an accident. It serves to maintain the engaging element in its position of rest. In an accident situation, the positioning means is overcome so that the engaging element can act, it may for example pivot about a hinge joint, until it positively engages the sector gear. The positioning means may for example be a shearing pin that is destroyed on triggering the buckle tightener and on releasing the resulting force which then acts on the engaging element. The positioning means may also be a spring that pulls the engaging element against a stop, thus maintaining it in the normal position, but that is overcome on triggering the buckle tightener. Other designs are also possible.

In a particularly preferred embodiment, the vehicle seat has, on one side of the seat, a locking device for the angular adjustment of the swivelling prop of this side of the seat and on the opposite side of the seat it has the array with engaging element and sector gear described above. In other words, the swivelling prop hitherto described is located on one side of the seat, more specifically on that side of the seat that is located on the side of the tunnel. Another swivelling prop is provided for on the other side of the seat. The two swivelling props are non-rotatably linked to each other by a transverse bar. A locking device for the angular adjustment for the two swivelling props is provided on the other seat side only. As a result thereof, it is not necessary to transmit the lock from one seat side to the other on one hand, on the other hand, enough space is thus obtained for the described safety device comprising the engaging element and the sector gear.

In order to absorb the reaction force produced on triggering the buckle tightener, it is advantageous to sufficiently fasten a housing of the buckle tightener on the seat carrier. It is advantageously supported on the hinge joint without thereby impeding the movement of the engaging element. It may however move to a certain extent about the hinge joint. The holding means of the tightener restricts a pivotal movement of the tightener.

Further advantages and characteristics of the invention will become apparent in the remaining claims and in the following description of exemplary embodiments of the invention that are not limiting the scope of the invention. The description refers to the drawing.

Figure 2:
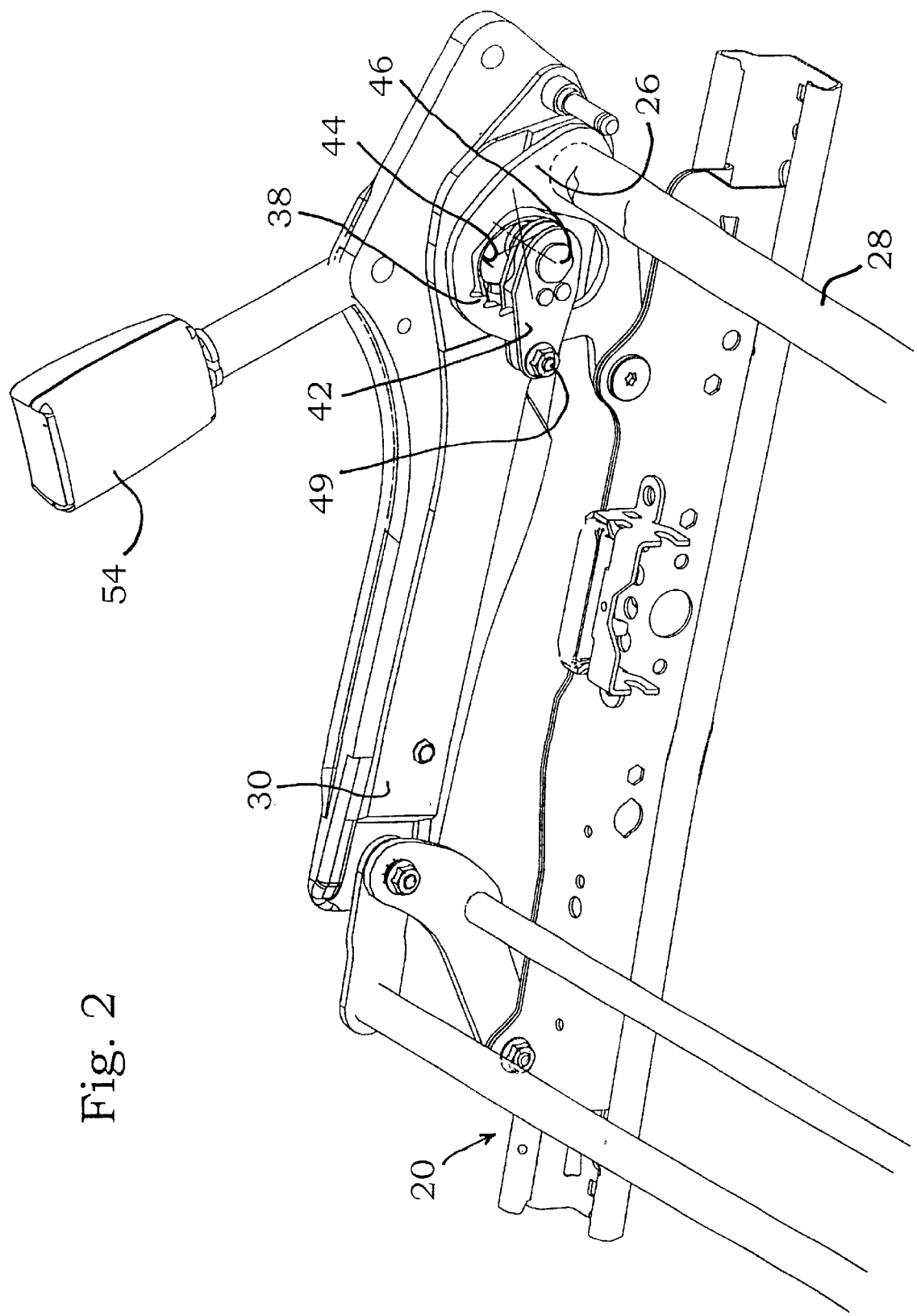
Figure 3:
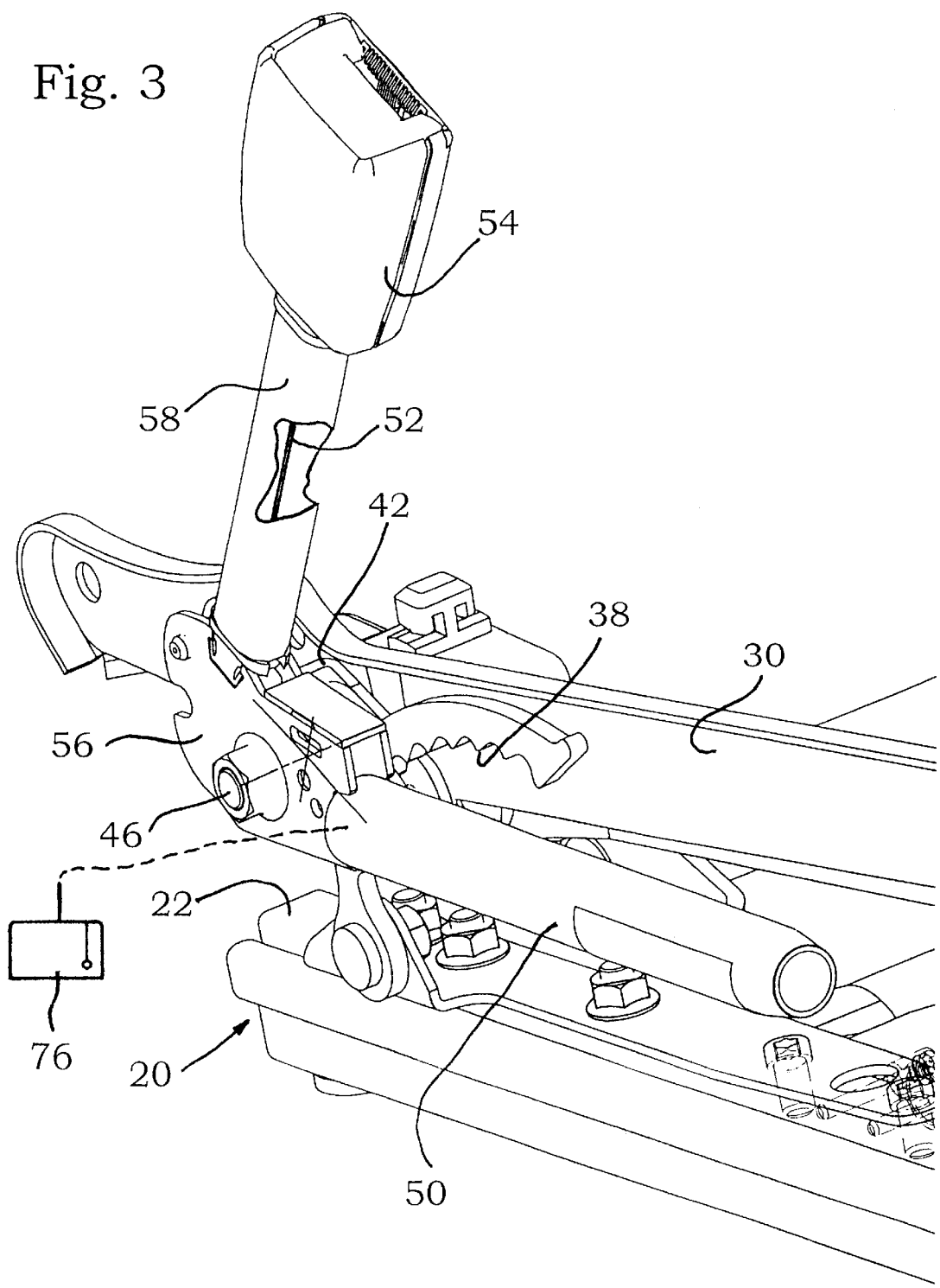
Figure 4:
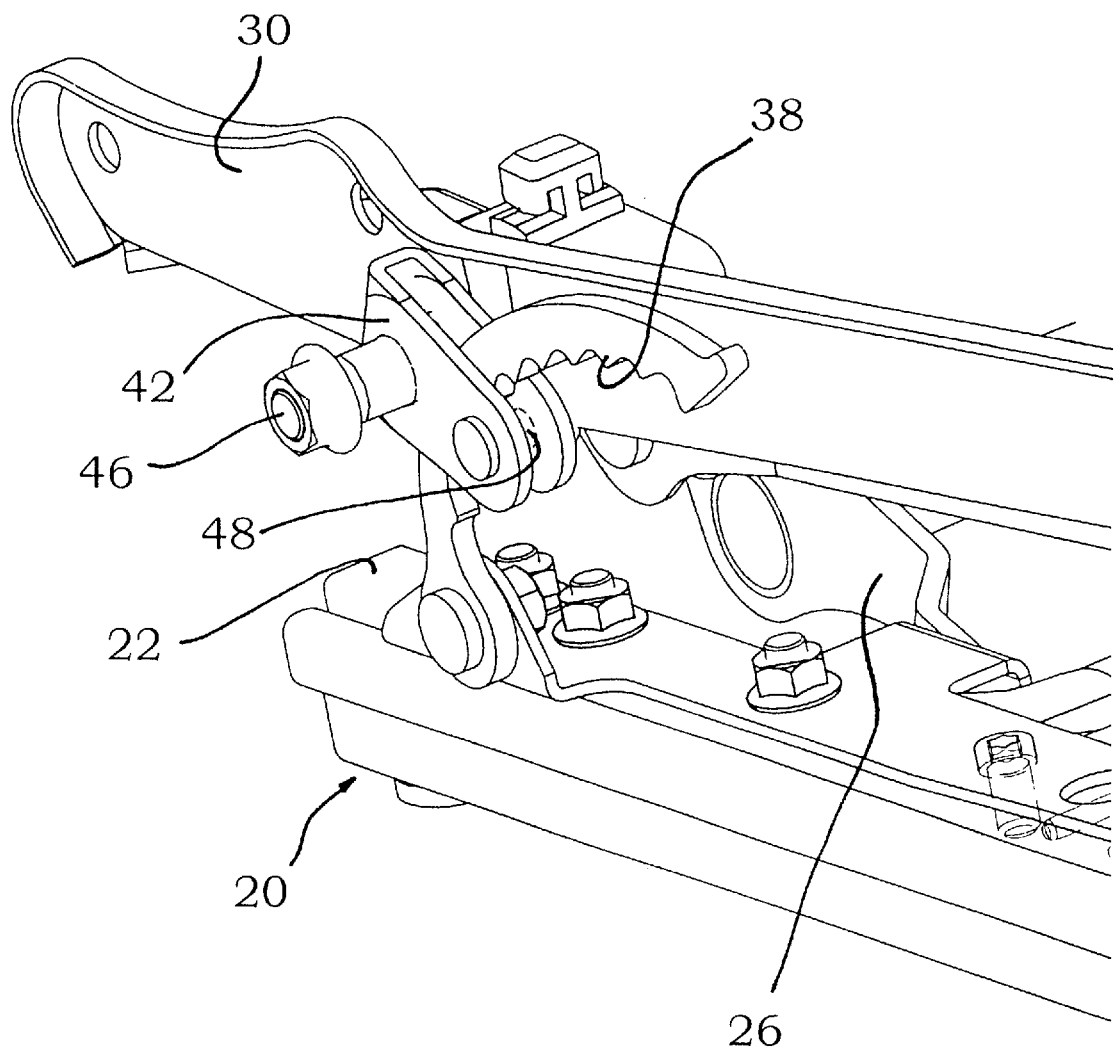
Figure 5:
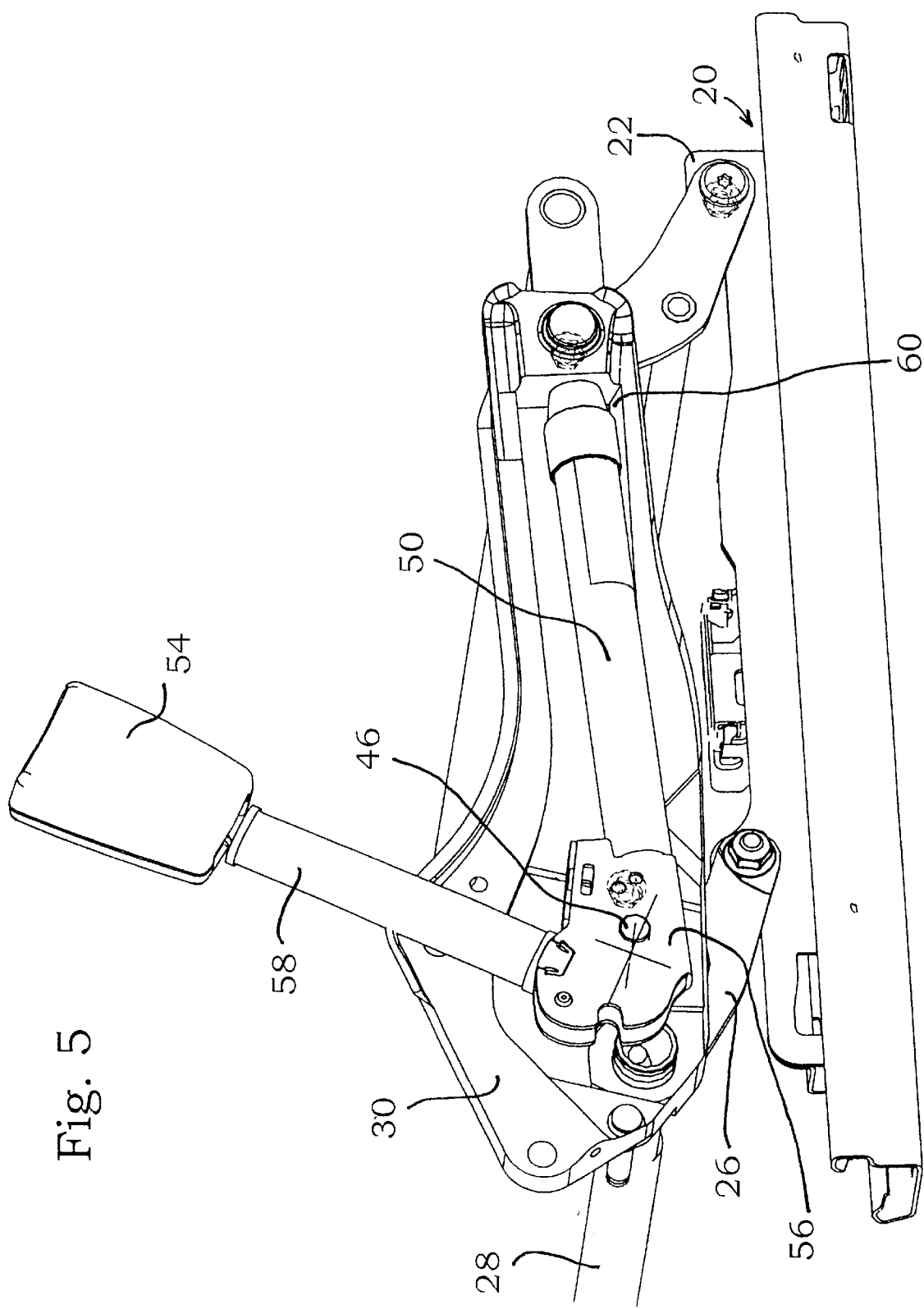
Figure 6:
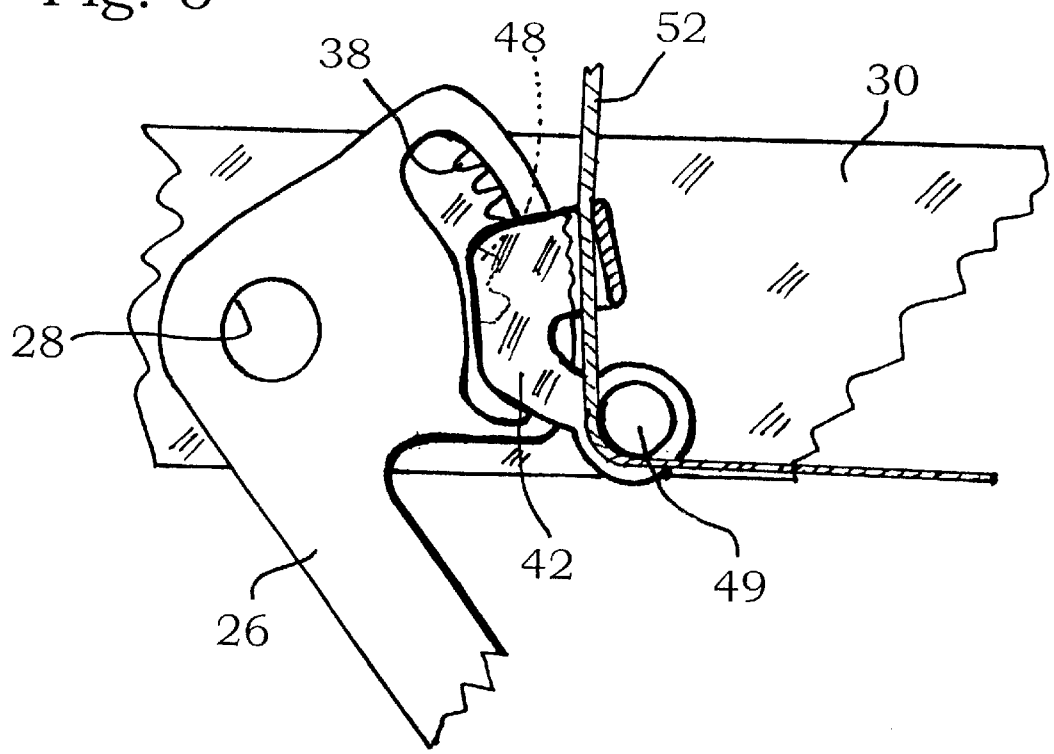
Figure 7:
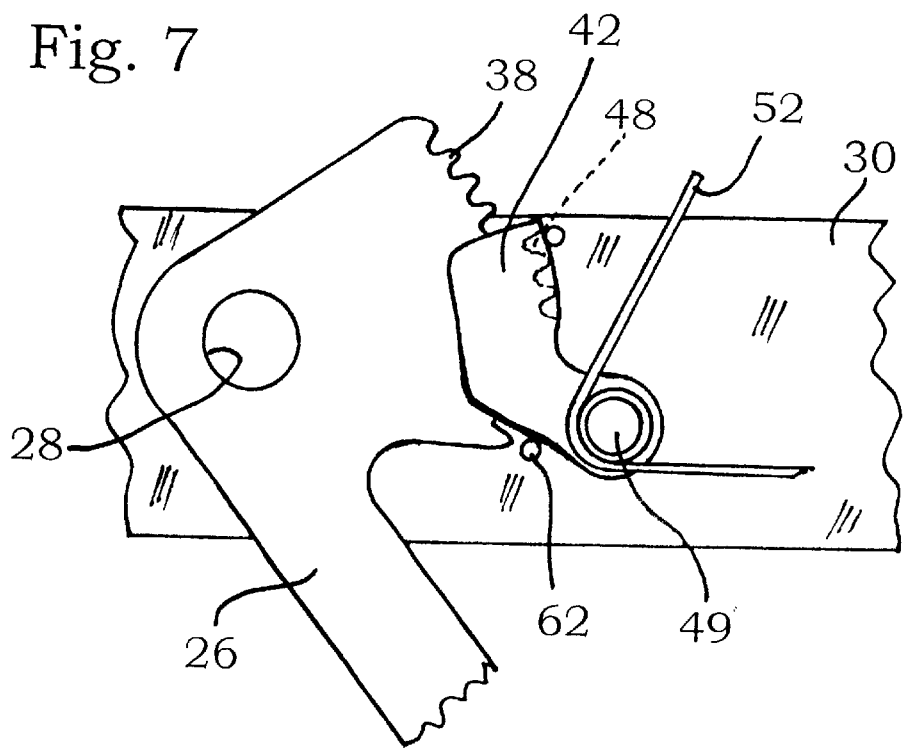

FIG. 1: is a perspective view of a seat underframe with seat carrier of a vehicle seat, FIG. 2: is a view of an embodiment similar to that of FIG. 1 illustrating only one side of the underframe and the corresponding side of the seat carrier, FIG. 3: is a perspective representation of the rear hind hedge of an arrangement according to FIG. 1, FIG. 4: is the perspective representation according to FIG. 3, but now without the tightener including the buckle, FIG. 5: is a perspective view from behind in oblique direction of the right side of an underframe with the corresponding part of the seat carrier, FIG. 6: is a basic representation of a region of engagement between engaging elements and sector gear with deflection and FIG. 7: is a basic representation similar to that of FIG. 6, engagement being achieved here by pivotal drive of the engaging element.

The FIGS. 1 and 2 constitute a first exemplary embodiment. Although the embodiments of these two figures differ in constructional details, the inventive features agree to such an extent that it seems appropriate to discuss and talk them over in concert.

The underframe of a vehicle seat shown in FIG. 1 is adjustable in height. Two pairs of longitudinal adjusting devices 20 with one seat rail 22 each are hinged to a seat carrier through front swivelling props 24 connected by way of a transverse bar 25 and through rear swivelling props 26 that are non-rotatably connected to each other by way of a rotary tube 28. Said seat carrier has two side parts 30 and one U-shaped connecting part 32 which also defines a front edge 34 of the seat. The adjustment in height is accomplished in the known way by an electromotor 36 that has a near driving a pinion which engages a sector gear, the design of which is similar to that of the still to be discussed sector gear 38 of the right seat side.

This sector gear 38 is arranged in a centric manner with respect to an axis 40 of the rotary tube 28. It is executed on a brim of a long hole of the rear right-handed swivelling prop 26, said brim pointing toward the axis 40. As a result thereof, it can be surrounded in an annular manner, it is shown surrounded by an engaging element 42 which can be surveyed more closely from FIG. 2. The engaging element substantially consists of two side parts that are built according to the same design principle and are approximately oval in shape. They are spaced apart so that the sector gear 38 can freely pivot between them. In the region of the long hole of the rear right-handed swivelling prop they are connected by a bolt 46 that protrudes from a long hole 44 of the right side part 30, thus being accessible from the outer side of the right side part 30. There, like in the embodiment according to the FIGS. 3 through 5, it is connected to a tightener unit as can be seen for example from the FIGS. 3 and 5, these Figures will be discussed later.

Furthermore, the two side parts of the engaging element 42 are hinged to the side part 30 by way of a hinge bolt 49. As a result thereof, the engaging element 42 can pivot about the axis of said bolt. A locking means 48 is provided between the two side parts and in proximity to the sector gear 38. It is designed in such a manner that it may mesh with the teeth of the sector gear 38. This engagement occurs when the engaging element 42 is pivoted about the bolt 46 or about the hinge bolt 49 and when the pivoting angle is sufficient to permit the locking means 48 to engage the sector gear 38.

In factual terms, the engaging element 42 and sector gear 38 are moved into mesh by the fact that, on actuating a tightener that has still to be described, said tightener is rotated about bolt 46 together with the engaging element 42 that is fixed on said tightener to rotate in unison therewith, thus causing engagement to occur. This will be explained more fully with reference to the drawings 3 through 5.

In the second exemplary embodiment according to the FIGS. 3 through 5, the sector gear 38 is executed on a sword curved like an arc, it is located on the inner curve. Said sword is hinged to the right seat rail 22 by means of a bracket, the articulation axis is parallel to the axis 40. The sword has a nose on its free end.

The sword is completely surrounded by an engaging element 42 whose design is similar to that of the engaging element in the first exemplary embodiment. Again, the engaging element is carried on the side part 30 in such a way that it is rotatable about a bolt 46. Said bolt 46 also carries the tightener. The locking means 48 is realized by a pin located in proximity to the sector gear 38. When the engaging element 42 pivots about the axis of the bolt 46, it exerts a pressure onto the back of the sword, the locking means 48 is caused to engage the teeth of the sector gear 38. A connection with tensile strength is thus achieved.

The tightening device will be discussed more fully hereinafter. In the design shown in the FIGS. 3 through 5, it pertains to the state of the art. It has a driving cylinder 50 that may exert high tensile bad on a means with tensile strength 52 In the form of a rope (see FIGS. 3, 6 and 7) when electrically triggered by an acceleration detector 76. This pull causes a buckle 54 to be drawn downward toward the side part 30. The driving cylinder is attached to a housing 56 that also transmits the reaction force. A bore for the bolt 46 is provided in said housing 56, the means with tensile strength 52 being wrapped about said bolt 46. The angle of wrap amounts to approximately 120°. The means with tensile strength 52 is accommodated in a flexible sheath 58 between housing 56 add buckle 54. Said sheath deforms when the driving cylinder 50 is triggered, it shortens.

The driving cylinder 50 is supported at its free end that points toward the front edge 34 of the seat. Said end is located in proximity to a resting area 60 formed by the side part 30. In another embodiment, a stop is provided for beneath the front end.

On being triggered, the driving cylinder 50 pulls the means with tensile strength 52 about the bolt 46 toward itself, the buckle 54 is moved downward as a result thereof. Since the complete tightening unit with buckle 54 is only attached to the bolt 46, it is capable of pivoting about the latter. Such a pivoting motion however is impossible at normal operation of the vehicle, the bolt is tightened so much that the pivoting motion does not occur. In another embodiment, a safety pin is provided which fixates the housing 56 in the normal position and which is shorn off or destroyed in any other way in the event of an accident.

When the driving cylinder 50 is triggered, the complete tightening unit pivots about the bolt 46, in the representation according to the FIGS. 3 and 5 it pivots clockwise. This movement is a result of the pivoting motion of the tightening unit about the axis of the bolt 46 while the pull acts upon the outer area of the bolt. In fact, the pull is applied somewhat underneath the axis of rotation so that the described clockwise sweep is caused to happen.

This pivoting motion causes the engaging element 42 and the sector gear 38 to move into mutual mesh. In order to limit the pivoting motion, the support area 60 or an appropriate stop is provided for on the side part 30. It is also possible to allocate the appropriate stop to the housing 46. The crucial point is that the maximum angle through which the complete tightening unit can be pivoted about the bolt 46 be limited.

FIG. 6 shows another embodiment for causing the engaging element 42 and the sector gear 38 to mesh. Again, a side part 30 is shown that carries a rear swivelling prop 26 that is pivotal about the axis of a rotary tube 28. Like in the first exemplary embodiment, the swivelling prop 26 has a sector gear 38 that is executed within a curved long hole. Again, it is encompassed by the engaging element 42 that is in parts shown in a sectional view. It has a locking means 48 that is assigned to the teeth of the sector gear 38 and that normally is out of gear. The engaging element 42 is carried on the swivelling prop 26 in such a manner that it is pivotal about the hinge bolt 49. Like in the previous exemplary embodiments, the means with tensile strength 52 has an upper portion that leads to the buckle 54 not shown and a lower portion that leads to the driving cylinder 50 not shown. The upper portion is encompassed by the engaging element 42 that has a corresponding encompassing region located outside the swivelling prop 26. In said region, the upper portion is slightly deflected to the left. If now a pull occurs in the means with tensile strength 42, this deflection is corrected, which brings the engaging element 42 to pivot clockwise. This causes engagement to happen. The hinge bolt 49 constitutes the point of deflection for the means with tensile strength 52.

The embodiment according to FIG. 7 again shows the parts according to FIG. 6, but now, the sector gear 38 is provided for on an outer edge of the swivelling prop 26. The engaging element 42 straddles the sector gear 38 in the shape of a U. It is again carried so as to be pivotal about the bolt, but now the tension means is not directly wrapped around the bolt but around a sleeve that is non-rotatably connected to the engaging element 42 and that can rotate relative to the bolt.

As the means with tensile strength 52 is tensioned, the means with tensile strength rotates the sleeve counterclockwise and takes the engaging element 42 along until said engaging element has become engaged. Then, the means with tensile strength 52 rides over the sleeve, which it also does in the previous embodiments, although there it rides over the bolt.

FIG. 7 shows a safety pin 62 that maintains the engaging element 42 in the position shown. It is calculated to be sheared off in the event of a pull occasioned by an accident so that the engaging element 42 is capable of swivelling into position.

Other possibilities to fixate the engaging element 42 in the normal position are conceivable. Fixation may occur by means of a spring that is overcome in the event of a load occasioned by an accident.

What is claimed is:

1. Vehicle seat of a vehicle, the vehicle seat comprising a seat carrier having a side part, a buckle of a safety belt positioned on the seat carrier, and a vertically adjustable underframe, said underframe being provided with, a sector gear, an engaging element being arranged on the seat carrier, which engaging element cooperates with the sector gear and which engaging element under normal, non-accidental circumstances of the vehicle is in a position of rest in which the engaging element is free from the sector gear, a means with tensile strength being provided, that is connected with the engaging element and has an upper end and a lower end, the buckle being connected to the upper end, in an accident situation of the vehicle, when the means with tensile strength is pulled, the engaging element blocks the sector gear, wherein a tightening unit for the belt is provided that has a driving cylinder, the other end of the means with tensile strength being arranged on the driving cylinder, a holding means for the tightening unit is provided on the side part, a point of deflection for the means with tensile strength is provided in which the means with tensile strength is deflected in its direction, a lower portion of the means with tensile strength running substantially in a longitudinal direction of the aide part.

2. The vehicle seat according to claim 1, wherein the point of deflection for the means with tensile strength is arranged on the engaging element at a bolt or at a hinge bolt.

3. Vehicle seat according to claim 1, wherein the tightening unit has a housing that is pivotally fixed and hinged about a bolt to the side part of the seat carrier.

4. Vehicle seat according to claim 1, wherein a control unit having an acceleration detector is provided and the tightening unit is connected to the control unit.

5. Vehicle seat according to claim 1, wherein the tightening unit is non-rotatably connected to the engaging element.

6. The vehicle seat according to claim 1, wherein a holding device is provided on the side part and the driving cylinder has a rear end that is turned away from the lower end of the means with tensile strength, the holding device being arranged at the rear end.

7. The vehicle seat according to claim 6, wherein a holding device is a stop face provided on the side part.

8. The vehicle seat according to claim 1, wherein a positioning means is provided, which is overcome in the event of an accident situation of the vehicle, the engaging element being additionally connected to the seat carrier by the positioning means.

9. The vehicle seat according to claim 8, wherein the positioning means is one of an elastic means and a destructible means.

10. Vehicle seat according to claim 1, wherein the underframe has two swivelling props hinged on the seat carrier, one of the two swivelling props being located on a tunnel side of the seat, the other of the two swivelling props being located on the other side of the vehicle seat, a transverse bar is provided, the two swivelling props being non-rotatably connected to each other by way of the transverse bar and a locking device is provided for an angular adjustment of the swivelling props on one side of the seat only.

11. Vehicle seat according to claim 10, wherein the locking device is provided on the side of the seat which is opposite to the tunnel side.

12. Vehicle seat according to claim 1, wherein the sector gear has the form of a sword that is supported on the underframe and has an axis, so as to be capable of freely pivoting about the axis of the sword.

13. The vehicle seat according to claim 12, wherein the sector gear which has the form of a sword is supported on a seat rail of the underframe.

14. The vehicle seat according to claim 1, wherein the sector gear exhibits a course that is concentric with an axis about which a rear swivelling prop of the underframe is connected to the seat carrier.

15. The vehicle seat according to claim 14, wherein the sector gear is configured integral with a rear swivelling prop.

16. The vehicle seat according to claim 1, wherein the point of deflection for means with tensile strength is arranged on the engaging element and the deflection of the direction of the means with tensile strength occurs through an angle ranging from 60° to 180°.

17. The vehicle seat according to claim 16, wherein the deflection of the direction of the means with tensile strength occurs through an angle ranging from 90° to 135°.

* * * * *